United States Patent
Kanya et al.

(10) Patent No.: US 7,462,371 B2
(45) Date of Patent: Dec. 9, 2008

(54) PROCESS FOR THE PREPARATION OF SOY BASED LOW-FAT AND HIGH PROTEIN SNACK

(75) Inventors: Thirumakudalu Chikkaraja Sindhu Kanya, Karnataka (IN); Holenarasipura Nanjundiah Chandrasekhara, Karnataka (IN); Tyakal Nanjundiah Indira, Karnataka (IN); Appu Rao Gopala Rao Appu Rao, Karnataka (IN); Visweshwariah Prakash, Karnataka (IN)

(73) Assignee: Council of Scientific & Industrial Research, New Delhi (IN)

( * ) Notice: Subject to any disclaimer, the term of this patent is extended or adjusted under 35 U.S.C. 154(b) by 567 days.

(21) Appl. No.: 10/380,863

(22) PCT Filed: Mar. 26, 2002

(86) PCT No.: PCT/IB02/01154

§ 371 (c)(1),
(2), (4) Date: Sep. 23, 2003

(87) PCT Pub. No.: WO03/079815

PCT Pub. Date: Oct. 2, 2003

(65) Prior Publication Data

US 2005/0100652 A1    May 12, 2005

(51) Int. Cl.
*A23L 1/20*    (2006.01)
*A21D 13/00*    (2006.01)

(52) U.S. Cl. ............... 426/634; 426/549; 426/653; 426/496

(58) Field of Classification Search ............ 426/634, 426/653, 549, 496
See application file for complete search history.

(56) References Cited

U.S. PATENT DOCUMENTS

| | | | | |
|---|---|---|---|---|
| 505,270 A * | 9/1893 | Hicks et al. | ............... | 49/32 |
| 3,601,064 A * | 8/1971 | Jackel et al. | ............... | 426/20 |
| 3,849,582 A * | 11/1974 | Blagdon et al. | ............... | 426/550 |
| 3,911,142 A * | 10/1975 | Huelskamp et al. | ............... | 426/559 |
| 4,124,727 A * | 11/1978 | Rockland et al. | ............... | 426/549 |
| 4,212,892 A * | 7/1980 | Chahine et al. | ............... | 426/289 |
| 4,421,770 A * | 12/1983 | Wiker et al. | ............... | 426/89 |
| 4,623,548 A * | 11/1986 | Willard | ............... | 426/559 |
| 4,769,253 A * | 9/1988 | Willard | ............... | 426/559 |
| 4,770,891 A * | 9/1988 | Willard | ............... | 426/559 |
| 4,778,690 A * | 10/1988 | Sadel et al. | ............... | 426/560 |
| 5,171,600 A * | 12/1992 | Young et al. | ............... | 426/550 |
| 5,188,859 A * | 2/1993 | Lodge et al. | ............... | 426/560 |
| 5,298,268 A * | 3/1994 | Maegli | ............... | 426/93 |
| 5,362,511 A * | 11/1994 | Villagran et al. | ............... | 426/549 |
| 5,464,643 A * | 11/1995 | Lodge | ............... | 426/439 |
| 5,922,386 A * | 7/1999 | Reed et al. | ............... | 426/549 |
| 6,033,707 A * | 3/2000 | Lanner et al. | ............... | 426/445 |
| 6,517,861 B2 * | 2/2003 | Singh et al. | ............... | 424/439 |

OTHER PUBLICATIONS www.panchangam.com- The Online Panchangam-Traditional Recipes (c) 2000.*
Meenakshi Ammal "Cook and See", Part I, Jan. 1988, p. 202.*
"Soy Pakoda" downloaded from archived pages of http://www.indiatastes.com/categories/416.html, Jun. 2001.*
"The New Dalda Cook Book". Vikas Publishing House Pvt. Ltd, 1975, p. 123.*
Diabetic-Lifestyle.com, downloaded archived pages from http//:diabetic-lifestyle.com/articles/jan99_cooki_1.htm, 5 pages, May 1999.*
Premila Lal, "Indian Cooking for Pleasure" 1970 pp. 126-127.*
Soy fact sheet, downloaded from http://www.soyfoods.org on Mar. 31, 2007.*
"Getting Specific", 1 page downloaded from http://www.fda.org on Mar. 31, 2007.*
"Art of Cooking Indian Food: Soy Meal Maker" downloaded from http://letusallcook.blogspot.com/2008/04/soya-meal-maker-recipe.html, Apr. 2008, 4 pages.*
"Getting serious with Soy", downloaded from http://www.khanakhazana.com/health/articles/soy.aspx, archived, dated Nov. 2006, 3 pages.*
"Soya-veg burger", downloaded from cooknshare.blogspot.com/2007/10/soya-veg-burger.html, dated Oct. 2007, 5 pages.*
"Great Soy Meal Ideas", downloaded from www.gomestic.com/Cooking/Great-Soy-Meal-Ideas.41566, Aug. 2007, 3 pages.*

* cited by examiner

*Primary Examiner*—C. Sayala
(74) *Attorney, Agent, or Firm*—Abelman, Frayne & Schwab

(57) ABSTRACT

A soy based, ready-to-eat, low-fat, high protein snack food and a process for its manufacture prepared by blending in a ribbon blender full-fat soy flour (5-20%), bengal gram flour (24-40%), rice flour (18-20%), chili powder (0.5-0.7%), and baking powder (0.25-0.35%) to obtain a dry mix, which, in turn, is mixed with water (25-30%) in a Hobart mixer to form a dough which is extruded into a desired shape and thickness and baked for 15-60 minutes at a temperature range of 165-190° C. to finally obtain a product having a protein content of (24-25%) and a fat content of (10-11.5%).

16 Claims, No Drawings

PROCESS FOR THE PREPARATION OF SOY BASED LOW-FAT AND HIGH PROTEIN SNACK

TECHNICAL FIELD

The present invention relates to a soy based low-fat and high protein snack and a process for the preparation of soy based low fat and high protein snack.

BACKGROUND ART

Generally, manufacture of a snack food involves some form of extrusion of cereal/pulse dough followed by frying. Some times such products are also roasted for direct consumption, such as papad, or wafers. It is a common practice to add fat (shortening) to obtain the product crisp. In many developed countries they are usually prepared by high-pressure extrusion to achieve high degree of expansion. In India these are made by forming extrusion (or sheeting by rollers) optionally with addition of some leavening agents followed by deep-frying in oil or roasting, leading to a crisp product.

A few processes available for the production of low-fat products in different countries are described.

Reference May be made to Lanner et al., 2000, the Procter & Gamble, Cincinnati, U.S. Pat. No. 6,033,707 wherein a fried snack product is extruded and shaped into a design. The dough is formed by mixture of starch-based flour with a specific ratio of gelatinized starch and an amount of protein. The emulsifier keeps the integrity of the structure of the product. However, this product is deep-flied and may not result as a low-fat product.

Reference may be made to Reed et al., 1999, The Procter & Gamble, Cincinnati, U.S. Pat. No. 5,922,386, wherein a reduced fat, shaped snack product having light, crispy and crunchy texture is prepared. The product has the fat content of 20-38%. However, this product is starch flour based and the fat content in the product is much higher than in the present investigation.

Reference may be made to Lodge et al., 1995, The Procter & Gamble, Cincinnati, U.S. Pat. No. 5,464,643, wherein a low-fat, shaped fried snack product having light, crispy and crunchy texture is prepared. The product is starch flour based with 3% hydrolyzed starch. The dough is formed and made into sheets and fried to provide a snack having 20-32% fat and having more flavors. However, the fat content in the product is much higher than in the present investigation and the product is not soy based.

Reference may be made to Villagran et al. 1994, The Procter & Gamble, Cincinnati, U.S. Pat. No. 5,362,511, wherein a fried snack food based on cereal grain having improved qualities are developed. The cereal grain based dough containing a protein is extruded and deep-fried to have reduced gumminess or tooth packing and grittiness. However, this product is deep-fried and may not result as low-fat product.

Reference may be made to Maegli-JW, 1994, Beatreme Foods, Beloit, Wis., USA, U.S. Pat. No. 5,298,268, wherein, a low-fat, seasoned, cereal-based snack food having low moisture content by the use of an adhesive is described. However, this is not a soy-based snack.

Reference may be made to Finger-P J and Eckhardt-D, 1994, Kernel Foods, London, NW-10 6EX, UK, UK patent No. GB 2270613A, wherein the method of making a snack food involves the preparation of dough from durum wheat flour and water, shaped, fried and cooled rapidly. The snack mentioned here is wheat based and not soy.

Reference may be made to Lodge R W and Allen C H 1993, The Procter & Gamble, Cincinnati, U.S. Pat. No. 5,188,859, describing the process for preparing a low-fat snack with a light, crispy, crunchy texture, made from potato flour, sheeted, cut and coated with oil and cooked with hot air or superheated steam. The cooked snack contains 10-20% fat, having fried like texture and flavor. This product is prepared with potato flour and not soy.

The reference may be made to Young et al., 1992, The Procter & Gamble, Cincinnati, U.S. Pat. No. 5,171,600, wherein a process for preparing a low-fat shaped snack product having a light, crispy texture prepared from 50-80% potato flour, sheeted and cut or extruded, fried to moisture of 5-15% and excess fat removed by superheated steam, resulting in a snack having 12-25% fat is described. However, this product is not soy based.

Reference may be made to Ueda et al., 1991, Otsuka pharmaceutical co. Lmt. Tokyo, Japan, U.S. Pat. No. 505,270, wherein, a high protein nutritive food which has a protein content of 40-85% (based on solids) is prepared by heating the dough under reduced pressure using soy proteins. However, the formulation and method of preparation is different from the present product.

Reference may be made to Gage et al 1988, The Procter & Gamble, Cincinnati, European patent No. EP 0287158A2, describing the preparation of extruded-cooked snack chips comprising corn, fat and water. The chips are lower in fat and higher in fibre than conventional snack chips containing up to 1% emulsifier, having light texture, an absorbent material for crunchiness. Process involves extrusion cooking to 60-80% gelatinization and fried in shortening. However, this product is prepared by extrusion cooking and is corn based.

Reference may be made to Willard M J, 1988, Willard, Idaho Falls, Id., USA, U.S. Pat. No. 4,770,891 wherein, an expanded fried cereal-based snack product are prepared from a low-water-absorbing component, a high-water-absorbing component and a starch component. The total dry solids are mixed with water to form dough, sheeted, cut into pieces and fried in hot oil to form a fried snack with low-fat content. This is totally a cereal-based snack product.

Reference may be made to Willard M J, 1988, Willard, Idaho Falls, Id., USA, U.S. Pat. No. 4,769,253, for the preparation of an expanded fried cereal-based snack product is given comprising low-water-absorbing component, a high-water-absorbing component and a starch component, extruded and fried in hot oil, to get a low-fat snack. The snack that mentioned here is cereal based.

Reference may be made to Open Shaw and Toft 1987, D&S Bolton UK, UK patent No. 2178637A, wherein, water is added to a mixture of wheat bran and ungelatinised starch and cooked to give a plastic mass, which is sheeted and cut. The cut pieces are fried in hot oil. The protein can be enhanced with caseinates, soy protein or wheat or corn gluten. The finished product has a high fibre content and fat more than or equal to 5%. The finished product is rich in fibre and starch based and soy is incorporated to increase the protein content.

Reference may be made to Willard M J, 1986, Willard, Idaho Falls, Id., USA, U.S. Pat. No. 4,623,548, wherein, dough is prepared from low-water-absorbing component, a high-water-absorbing component and a starch component, mixed with water to form dough, extruded and fried to form a snack of low-fat content. However, the product mentioned here does not contain soy.

Reference may be made to Wiker and Cunningham, 1983, Kansas State University Research Foundation, Manhattan, Kans., U.S. Pat. No. 4,421,770, wherein, a high protein snack food prepared from egg protein by involving a process of heat coagulation. The principal ingredient is starch in the batter mix. However, the product is not soy based and not a low-fat product.

Reference may be made to Howard A N, 1982, South African patent No. ZA 81/7470, describing the method of preparation of crisps having low calorific value even when fried. They consist of discrete cooked portions of dough of gelatinized starch and cereal bran other than rice bran as a fiber. Oil content is preferentially 5-30%. These are mainly starch-based crisps and do not contain soy.

Reference may be made to Toft J G, 1980, Standard Brands Inco. U.S. Pat. No. 4,212,892, wherein, a high protein extruded snack food comprising a plastic protein gel with dry potato/corn starch or flour is developed. The protein gel is prepared using fish and soybean. The snack food is nutritionally superior to potato chips, having protein level of 18-20%. However, this product is deep-fried and may not result as a low-fat product and the source of protein is from animal and plant sources. The product is prepared using pre gelled soy protein.

Reference may be made to Rockland L B and Radke T M, 1978, United States of America, Secretary of Agriculture U.S. Pat. No. 4,124,727, describing a process for preparing a legume based, nutritionally balanced protein food product. The process includes treating the seeds to render them quick cooking, cooking the seeds and mashing and mixing with methionine containing cereal flours, oil seeds etc., adding water to form a dough, extruded and fried in oil.

Reference may be made to Hahn D T, 1978, Ralston Purina Co. St. Louis Mo., U.S. Pat. No. 4,120,988, wherein a protein based snack food having expanded and puffed texture using soy protein isolate are developed. Soy protein isolate is in the form of gel, which maintains the structural integrity of the product. However, the formulation is based on processed soy proteins.

Reference may be made to Huelskamp et al. 1975,U.S. Pat. No. 3,911,142, wherein, a process for preparing a protein snack food is described, consisting of soy protein, dried whey and dried skim milk, wheat flour, potato flakes, flavor etc., adding some of the water and dry mixing the ingredients and resting the mass and adding the remaining water, forming sheets of dough and cutting into shapes and baking the product followed by air dehydration. The dough pieces may be fried also.

Reference may be made to Blagdon et al., 1974, Ralston Purina Co. St. Louis, Mo., U.S. Pat. No. 3,849,582, wherein, an aqueous mixture of a pre-gelatinized starch, soy protein isolate which has not been subjected to the gelling action of heat and a starch modifying and complex forming agent is shaped and fried to give a product with an improved crisp texture. However, this product is deep-fried and may not result in a low-fat product.

Reference may be made to Nestle S A. 1974, British patent No. 1350547, for a product, containing dough compositions of 14-16% protein, are extruded, frozen, sliced and deep-fried. The product under consideration is a fried product, which will not be a low-fat product.

Reference may be made to Sato et al 1973 Japanese patent No. 3843622, describes a process consisting of a mixture of soybean and vegetable materials. The mixture is steam heated to largely denature any gluten. Then it is cut to form pieces to be fried or roasted after being spray coated with oil.

OBJECT OF THE INVENTION

The main object of the present invention is to provide soy based low-fat and high protein snack.

Another object of the present invention is to provide a process for the preparation of soy based low fat and high protein snack.

Another object of the present invention is to provide maximum level of utilization of soy flour in ready-to-eat snack formulation.

Another object of the present invention is to provide a low calorie snack.

SUMMARY OF THE INVENTION

The present invention relates to a soy based low-fat high protein snack and a process for the preparation of soy based low-fat and high protein snack from full fat soy flour, gram flour, rice flour, gelatinized starch, salt and spices.

DETAILED DESCRIPTION OF THE INVENTION

Accordingly, the present invention provides a soy based low-fat and high protein snack having a protein content of 24-25% and fat content of 10-12%, said snack comprising of:

| | | |
|---|---|---|
| i. | Full fat soy flour | 5-20%, |
| ii. | Bengal gram flour | 24-40%, |
| iii. | Rice flour | 18-20%, |
| iv. | Gelatinized starch | 4-5%, |
| v. | Liquid fat | 6-8%, |
| vi. | Salt | 1.8-1.9%, |
| vi. | Chilli powder | 0.5-0.7%, |
| vii. | Ajwain powder | 0.5-0.7%, |
| viii. | Baking powder | 0.25-0.35% |
| ix. | Lecithin | 0.25-0.35% and |
| x. | Water | 25-30% |

In an embodiment, the invention provides a low-fat high protein snack having calorific value in the range of 390-425 kcals.

Another embodiment of the invention provides a low-fat high protein snack having bulk density ranges between 0.45-0.55 g/cc and shear value in the range of 4.0 to 5.0 Newton.

Still another embodiment of the invention provides a low-fat high protein snack having acceptable sensory level with respect to color, appearance, taste and overall on a 5-point hedonic scale with 10 trained panelists.

One more embodiment of the invention provides a process for the preparation of soy based low fat and high protein snack, the said process comprising:

a) blending the following ingredient thoroughly to obtain an uniform dry mix,

| INGREDIENTS | Wt (%) |
|---|---|
| i. Full fat soy flour | 5-20% |
| ii. Bengal gram flour | 24-40% |
| iii. Rice flour | 18-20% |
| iv. Gelatinized starch | 4-5% |
| v. Salt | 1.8-1.9% |
| Spices | |
| vi. Chilli powder | 0.5-0.7% |
| vii. Ajwain powder | 0.5-0.7% |
| Minor ingredients | |
| viii. Baking powder | 0.25-0.35% | b) dissolving lecithin in liquid fat, c) mixing with water the ingredients of steps (a) and (b) to obtain a dough, d) extruding dough of step (c), e) cutting and stranding the extruded dough of step (d) into desired shape and thickness, f) baking the extruded strands of step (e) and g) sorting and packing of final baked product having low-fat, high protein snack.

In an embodiment, blending is performed using ribbon blender.

In one embodiment, mixing is performed using a Hobart mixer.

In another embodiment, extrusion of dough is carried out to obtain 3-mm thickness sheets of the dough.

In yet another embodiment, cutting and stranding of dough is performed to obtain 30-50 mm pieces.

In still another embodiment, baking is performed at a temperature range of 165°-190° C. for a period of 15-60 minutes.

In still yet another embodiment, the product obtained has protein content of 24-25%.

In an embodiment, the product obtained has a fat content of 10-12%.

In another embodiment, the product has calorific value of 390-425 kcals.

In one another embodiment, the product has bulk density of 0.45-0.55 g/cc.

In an embodiment, the product has shear value in the range of 4.0 to 5.0 Newtons.

In a further embodiment, the product obtained has acceptable sensory level with respect to color, appearance, taste and overall on a 5-point hedonic scale with 10 trained panelists.

Novelty

Novelty steps of this invention are the development of a new process for the preparation of a low-fat and high protein ready-to-eat snack.

- The novelty of the formulation and process is that the addition of high percentage of full fat soy flour in such a manner, which does not affect the sensory profile (acceptable) of the product.
- The formulation and process is such that the final product remains a low-calorie snack without affecting the sensory profile.
- The formulation contains high percentage of full fat soy flour and Bengal gram flour because of which the product has high protein content (24-25%).
- The product contains low-fat (10-11.5%), since baking was adopted in place of deep fat frying.
- Full fat soy flour has been used at high proportion (20%) in the formulation.
- The product has a calorific value of 390-425 kcals.
- The formulation gives a ready to eat product.
- The snack prepared by this process is less expensive compared to commercially available snacks of this nature.

The process is further illustrated by the examples given below, which should not however be construed to limit the scope of the invention.

EXAMPLE-1

A process for the preparation of ready-to-eat high protein low-fat snack

| Ingredients | Wt (%) |
| --- | --- |
| Full fat soy flour | 6.31 |
| Raw bengalgram powder | 37.87 |
| Rice flour | 18.93 |
| Chilli powder | 0.63 |
| Ajwan seeds | 0.63 |
| Baking powder. | 0.32 |
| Vanaspathi | 6.30 |
| Salt | 1.89 |
| Lecithin | 0.32 |
| Water. | 26.80 |

One of the major ingredients, the full fat soy flour was incorporated at ≈6.3% level of the mix. 100 g full fat soy flour of 44 mesh size was mixed with 600 g raw Bengal gram powder, 300 g rice flour, 30 g salt, 10 g ajwan seeds and 5 g baking powder. All the ingredients were mixed well. To the dry mix 100 g vanaspathi and 5 g lecithin were added. All the ingredients were mixed and made dough with 425-ml water. The dough was then extruded to a noodle like shape and cut to 3-cm length. The ready-to-eat snack was then baked at 170 C for 20 minutes.

EXAMPLE-2

A process for the preparation of ready-to-eat high protein low-fat snack

| Major Ingredients | % |
| --- | --- |
| Full fat soy flour | 12.43 |
| Raw bengalgram powder | 31.10 |
| Rice flour | 18.65 |
| Chilli powder | 0.62 |
| Ajwan seeds | 0.62 |
| Baking powder. | 0.31 |
| Vanaspathi | 6.20 |
| Salt | 1.86 |
| Lecithin | 0.31 |
| Water. | 27.90 |

As one of the major ingredients, the full fat soy flour was incorporated at ≈12.4% level. 200 g full fat soy flour of size 44 mesh size was mixed with 500 g raw Bengal gram powder, 300 g rice flour, 30 g salt, 10 g ajwan seeds and 5 g baking powder. All the ingredients were mixed well. To the dry mix 100 g vanaspathi and 5 g lecithin were added. All the ingredients were mixed and made dough with 450-ml water. The dough was then extruded to a noodle like shape and cut to 3-cm length. The ready to eat snack was then baked at 175 C for 20 minutes.

EXAMPLE-3

A process for the preparation of ready-to-eat high protein low-fat snack

| Ingredients | Wt (%) |
|---|---|
| Full fat soy flour | 18.05 |
| Raw bengalgram powder | 24.25 |
| Rice flour | 18.10 |
| Chilli powder | 0.60 |
| Ajwan seeds | 0.60 |
| Baking powder. | 0.30 |
| Vanaspathi | 6.00 |
| Salt | 1.80 |
| Lecithin | 0.30 |
| Water. | 30.00 |

As one of the major ingredients, the full fat soy flour was incorporated at 18.0% level. 300 g full fat soy flour of size −44 mesh size was mixed with 400 g raw Bengal gram powder, 300 g rice flour, 30 g salt, 10 g ajwan seeds and 5 g baking powder. All the ingredients were mixed well. To the dry mix 100 g vanaspathi and 5 g lecithin was added. All the ingredients were mixed and made dough with 500 ml water. The dough was then extruded to a noodle like shape and cut to 3 cm length. The ready to eat snack was then baked at 175 C for 22 minutes. The product, 1000 g of sev was obtained.

EXAMPLE-4

A process for the preparation of ready-to-eat high protein low-fat snack

| Ingredients | Wt (%) |
|---|---|
| Full fat soy flour | 18.10 |
| Raw bengalgram powder | 24.20 |
| Rice flour | |
| plain | 13.58 |
| gelatinised | 4.52 |
| Chilli powder | 0.60 |
| Ajwan seeds | 0.60 |
| Baking powder. | 0.30 |
| Vanaspathi | 6.00 |
| Salt | 1.80 |
| Lecithin | 0.30 |
| Water. | 30.00 |

Inclusion of gelatinized rice flour in the formulation was made to improve the texture of the product. As one of the major ingredients, the full fat soy flour was incorporated at 18.0% level. 300 g full fat soy flour of size −44 mesh size was mixed with 400 g raw Bengal gram powder, 300 g rice flour, 30 g salt, 10 g Ajwan seeds and 5 g baking powder. All the ingredients were mixed well. To the dry mix 100 g vanaspathi and 5 g lecithin were added. All the ingredients were mixed and made dough with 500 ml water. The dough was then extruded to a noodle like shape and cut to 3-cm length. The ready to eat snack was then baked at 180 C for 20 minutes. The product, 980 g of sev was obtained.

EXAMPLE-5

A process for the preparation of ready-to-eat high protein low-fat snack

| Ingredients | Wt (%) |
|---|---|
| Full fat soy flour | 12.40 |
| Raw bengalgram powder | 31.10 |
| Rice flour | |
| Plain | 14.11 |
| Gelatinised | 4.66 |
| Chilli powder | 0.62 |
| Ajwan seeds | 0.62 |
| Baking powder. | 0.31 |
| Vanaspathi | 6.20 |
| Salt | 1.86 |
| Lecithin | 0.31 |
| Water | 27.90 |

As one of the major ingredients, the full fat soy flour was incorporated at 12.4% level. 200 g full fat soy flour of size 44 mesh size was mixed with 500 g raw bengal gram powder, 300 g rice flour, 30 g salt, 10 g ajwan seeds and 5 g baking powder. All the ingredients were mixed well. To the dry mix 100 g vanaspathi and 5 g lecithin were added. All the ingredients were mixed and made dough with 450 ml water. The dough was then extruded to a noodle like shape and cut to 3 cm length. The ready-to-eat snack was then baked at 180 C for 22 minutes. The product, 930 g of sev was obtained.

The invention claimed is:

1. A soy based, reduced-fat and increased protein baked snack having a protein content of 24-25% and a fat content of 10-12%, said snack comprising:

| | | |
|---|---|---|
| i. | full fat soy flour | 5-20%, |
| ii. | bengal gram flour | 24-40%, |
| iii. | rice flour | 18-20%, |
| iv. | gelatinized starch | 4-5%, |
| v. | liquid fat | 6-8%, |
| vi. | salt | 1.8-1.9%, |
| vii. | chilli powder | 0.5-0.7%, |
| viii. | ajwain powder | 0.5-0.7%, |
| ix. | baking powder | 0.25-0.35% |
| x. | lecithin | 0.25-0.35% and |
| xi. | water | 25-30%. |

2. The reduced-fat increased protein snack as claimed in claim 1, having a calorific value in the range of 390-425 kcal.

3. The reduced-fat increased protein snack as claimed in claim 1, wherein its bulk density ranges between 0.45-0.55 g/cc.

4. The reduced-fat increased protein snack as claimed in claim 1, wherein its shear value is in the range of 4.0 to 5.0 Newtons.

5. A process for the preparation of a soy based reduced-fat and increased protein baked snack as claimed in claim 1, said process comprising the steps of:

a) blending the following ingredients thoroughly to obtain a uniform dry mix,

| INGREDIENTS | Wt (%) |
|---|---|
| i. full fat soy flour | 5-20% |
| ii. bengal gram flour | 24-40% |
| iii. rice flour - plain | 18-20% |
| iv. gelatinized starch | 4-5% |
| v. salt | 1.8-1.9% |
| Spices | |
| vi. chilli powder | 0.5-0.7% |
| vii. ajwain powder | 0.5-0.7% |
| Minor ingredient | |
| viii. baking powder | 0.25-0.35% | b) dissolving lecithin in liquid fat,
c) mixing with water the ingredients of steps (a) and (b) to produce a dough,
d) extruding the dough of step (c),
e) cutting and stranding the extruded dough of step (d) into a desired shape or shapes and thickness,
f) baking the extruded strands of step (e), and
g) sorting and packing the final baked snack product having reduced-fat, increased protein snack.

6. The process as claimed in claim 5, wherein in step (a) blending is performed using a ribbon blender.

7. The process as claimed in claim 5, wherein in step (a) the rice flour used is either plain or gelatinized.

8. The process as claimed in claim 5, wherein in step (c) mixing is performed using a Hobart mixer.

9. The process as claimed in claim 5, wherein in step (d) extrusion of the dough is carried out to produce a 3 mm-thickness sheet of dough.

10. The process as claimed in claim 5, wherein in step (e) cutting and stranding of dough is performed to obtain 30-50 mm pieces.

11. The process as claimed in claim 5, wherein in step (f) the dough is baked at a temperature range of 165°-190° C. for a period of 15-60 minutes.

12. The process as claimed in claim 5, wherein in step (g), the product obtained has a protein content of 24-25%.

13. The process as claimed in claim 5, wherein in step (g), the product obtained has a fat content of 10-12%.

14. The process as claimed in claim 5, wherein in step (g) the product has a calorific value of 390-425 kcals.

15. The process as claimed in claim 5, wherein in step (g) the product has a bulk density of 0.45-0.55 g/cc.

16. The process as claimed in claim 5, wherein in step (g) the product has a shear value in the range of 4.0 to 5.0 Newton.

* * * * *